(No Model.)
S. HACKETT.
HAND CORN PLANTER.
No. 334,583. Patented Jan. 19, 1886.
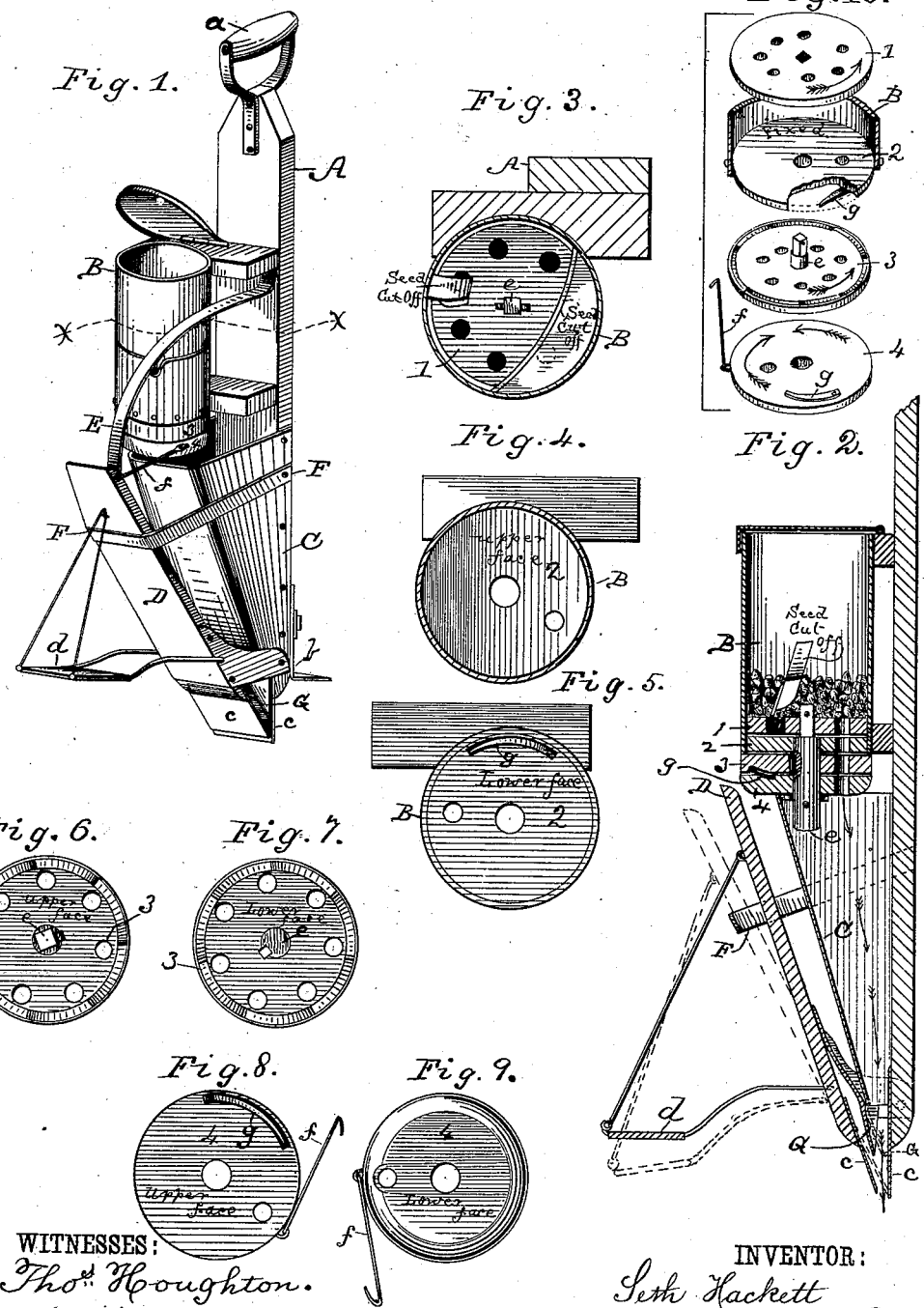
WITNESSES:
Thos. Houghton
Amos W Hart
INVENTOR:
Seth Hackett
BY Munn & Co
ATTORNEYS.

UNITED STATES PATENT OFFICE.

SETH HACKETT, OF BRONSON, MICHIGAN.

HAND CORN-PLANTER.

SPECIFICATION forming part of Letters Patent No. 334,583, dated January 19, 1886.

Application filed September 2, 1885. Serial No. 175,991. (No model.)

*To all whom it may concern:*

Be it known that I, SETH HACKETT, a citizen of the United States, residing at Bronson, in the county of Branch and State of Michigan, have invented a new and useful Improvement in Hand Corn-Planters, of which the following is a description.

My invention is an improvement in the class of hand corn-planters having a perforated seed-disk or cut-off, which is intermittently rotated to effect the discharge of the seed from its perforations or pockets.

My improvement consists in the construction and combination of parts, as hereinafter described and claimed.

In accompanying drawings, Figure 1 is a perspective view of the planter. Fig. 2 is a vertical section of the planter, showing the position of parts when seed is being dropped. Fig. 3 is a cross-section on line $x\ x$, Fig. 1. Figs. 4, 5, 6, 7, 8, 9 are different cross-sections of the seed-hopper, showing face views of the different seed-disks. Fig. 10 is a diagram showing the seed-disks separated and in perspective.

The staff or standard A of the planter is provided with a handle, $a$, and vertically-adjustable foot $b$, like certain other planters of this class. The seed-hopper B and seed-guide C are rigidly attached to one side of the staff, the former being placed above, but far enough to one side of the seed-guide to leave part of the open top of the latter exposed, (see Fig. 1,) so that the operator may conveniently observe the seed-delivery, and thus become cognizant of any clogging of the seed in the pockets of the rotary disks. The jaws $c\ c$, which enter the soil and form a cavity for reception of seed, are attached, respectively, to the staff A and a lever, D, which is pivoted to the latter and provided with a forwardly-extended foot, $d$. The upper or free end of the lever D is thrown outward by a spring, E, and limited in such movement by a loop, F, attached to the staff. The said loop has parallel sides, and hence guides or supports the lever laterally.

Between the jaws $c\ c$ is arranged a valve, G, Figs. 1, 2, for closing the discharge-opening of the seed-guide C, save when the jaws are open. The same consists of a spring-plate attached to the lever D, and having its sides bent to form parallel flanges, that prevent escape of seed laterally.

When the foot $d$ is pressed on the ground, Fig. 2, and the lever D thereby pressed back so as to open the jaws $c\ c$, the valve G is also opened, since it partakes to some degree of such movement of the lever; but when the lever resumes its normal position the valve again closes the discharge-orifice with an elastic pressure, and effectually prevents escape of seed until the next movement of the lever again compels it to open.

The seed-discharging mechanism connected with the hopper B consists of four perforated disks, (designated by the numerals 1 2 3 4.) Disks 1 and 3 have each seven perforations or seed-pockets, and 2 and 4 have each only one. No. 2 is fixed in the hopper, and the others have an intermittent rotary motion. Nos. 1 and 3 rotate together, being fixed on squared portions of a common axis, $e$, that also passes through the other disks, 2 and 4. No. 4 is connected with the lever D by a link, $f$, and makes one-seventh of a rotation at each oscillation of the lever. A spring-pawl, $g$, is attached to disk 4 and another to disk 2, and their free ends take into notches in the upper and under sides of disk 3, respectively, and prevent backward rotation of disk 2 while communicating motion from 4 to 3 and 1. It will now be apparent that when the lever D is tilted backward, Fig. 3, the lower disk, 4, rotates to the left, Fig. 2, so that its pocket registers with one of those in disk 3, and hence allows escape of the seed held in the latter. As the lever D resumes its normal position, disk 4 makes its backward or return movement, and thus its spring-pawl engages with disk 3 and causes the simultaneous rotation of disks 3 and 1. In this operation seed passes from one of the pockets in No. 1 to the opening in No. 2, thence through disks 3 and 4, as shown in Fig. 2.

It will be seen that disks 1 and 3 rotate intermittently in the same direction; but 4 has a reciprocating movement. This combination of pocketed disks secures a reliable delivery of seed every time the planter is operated or moved stepwise to the operator.

Within the hopper I employ two cut-offs. One levels the seed in the pockets, and in case any one of the seed-pockets is not then full it will surely fill in passing to the next cut-off, which again levels the seed and keeps back the body of seed in the hopper while the discharge takes place from one of the filled pockets.

What I claim is—

1. In a hand corn-planter, the combination of the four perforated disks 1 2 3 4, of which one is fixed, two rotate together, and the fourth rotates independently, the spring-pawls arranged, as specified, the seed-hopper, the pivoted vibrating lever, the link connecting the latter with the lower disk, and the seed-guide and jaws, all as shown and described.

2. The combination of the loop guide and stop with the pivoted spring-lever, and staff A, as shown and described.

3. The combination of the spring-valve, the pivoted lever to which it is attached, and the seed-guide, all arranged and operating as specified.

SETH HACKETT.

Witnesses:
WILLIAM H. COMPTON,
FRED L. WARNE.